2,714,927

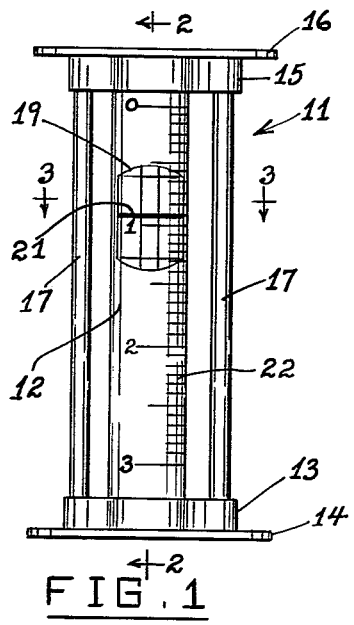
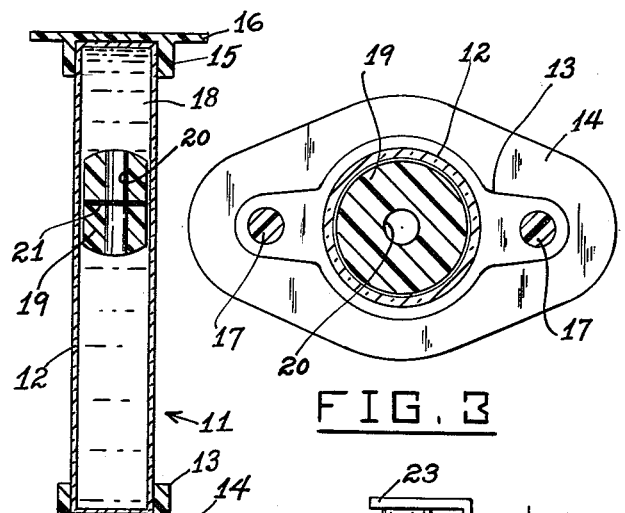
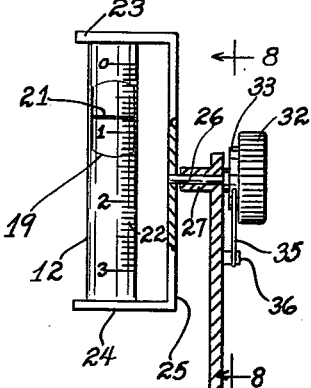
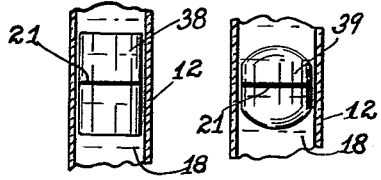
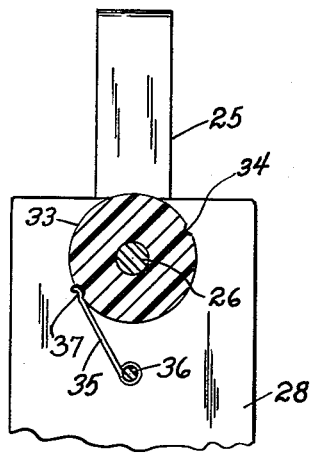
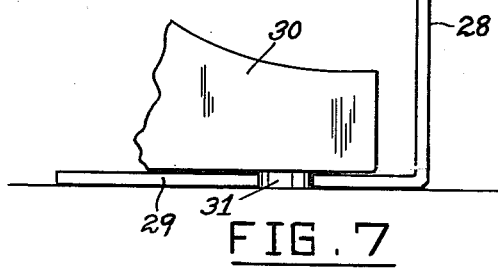
INVENTORS
KURT G. STERN AND
MAXWELL S. KAMM
BY Herman L. Gordon
ATTORNEY United States Patent Office 2,714,927
Patented Aug. 9, 1955

TIMING DEVICE

Kurt G. Stern and Maxwell S. Kamm, New York, N. Y.

Application June 18, 1953, Serial No. 362,518

1 Claim. (Cl. 161—15)

This invention relates to timers, and more particularly to a timing device wherein the passage of time is indicated by the movement of a float member through a liquid.

A main object of the invention is to provide a novel and improved timing device which is simple in construction, which is compact in size, and which is highly accurate in operation.

A further object of the invention is to provide an improved timing device which is inexpensive to manufacture, which is durable in construction, and which is easy to read.

A still further object of the invention is to provide an improved timing device to measure the passage of time by the movement of a float member through a liquid, said timing device being especially suitable for measuring the elapsed time of telephone conversations, cooking procedures, and the like, the accuracy of the device being substantially unimpaired by changes in room temperature or by other atmospheric changes, and the device being especially suitable for manufacture by mass production procedures, since the parts thereof need not be made to excessively close tolerances.

Further objects and advantages of the invention will become apparent from the following description and claims, and from the accompanying drawings, wherein:

Figure 1 is a front elevational view of an improved timing device constructed in accordance with the present invention.

Figure 2 is a vertical cross-sectional view taken on line 2—2 of Figure 1.

Figure 3 is an enlarged horizontal cross-sectional view taken on line 3—3 of Figure 1.

Figure 4 is a fragmentary vertical cross-sectional view illustrating a modified float element for use in a timing device according to the present invention.

Figure 5 is a fragmentary vertical cross-sectional view illustrating another form of float element for use in a timing device of the present invention.

Figure 6 is a fragmentary vertical cross-sectional view illustrating still another form of float element which may be employed in a timing device according to the present invention.

Figure 7 is a side elevational view, partly in cross-section, of a timing device according to the present invention adapted to be employed with a telephone set for indicating the elapsed time of telephone conversations, a fragmentary portion of the telephone set being illustrated.

Figure 8 is an enlarged cross-sectional view taken on line 8—8 of Figure 7.

Referring to the drawings, and more particularly to Figures 1, 2 and 3, 11 generally designates one form of timing device according to the present invention. Said timing device comprises a transparent cylindrical tube 12 secured at one end to a molded base member 13 having an enlarged bottom flange 14 for supporting tube 12 in a vertical position. Secured to the top end of tube 12, as viewed in Figure 1, is a molded member 15 identical with base member 13 and having the enlarged flange 16, whereby the tube may be supported in a vertical position inverted with respect to the position shown in Figure 1. Respective reinforcing rods 17, 17 are secured between the members 13 and 15 on diametrically opposite sides of and parallel to the tube 12.

Tube 12 is filled with a colorless, transparent liquid 18 having a viscosity which is substantially constant over a wide range of room temperatures, such as silicone fluid similar to Dow Corning DC 200 fluid, manufactured by Dow Corning Corporation, Midland, Michigan. This liquid is commercially available in various viscosity values.

Slidably disposed in the tube 12 is a float member 19 which may be generally cylindrical in shape and which is dimensioned to have a small clearance with respect to the inside surface of tube 12, to allow for reasonable manufacturing tolerances for members 12 and 19. The top and bottom ends of float member 19 may be spherically rounded, as shown in Figure 2. The float member is formed axially thereof with a cylindrical bore 20 which is relatively large in cross-sectional area as compared with the clearance between member 19 and the inside surface of tube 12.

The float member 19 is preferably of transparent, colorless material having substantially the same light-transmitting properties as the transparent liquid 18. Said float member is provided with the dark, opaque index band 21 extending peripherally around its mid-portion. Said index element 21 may, for example, comprise a layer of dark, opaque plastic material cemented between a pair of top and bottom colorless transparent segments, of suitable plastic material, forming the main body of float member 19.

The density of the material of the float member 19 is preferably somewhat greater than the density of the liquid 18, whereby the float member will sink from the top end of the tube 12 to the bottom end of said tube in a predetermined time. Said tube is provided with a scale 22 calibrated in units of time, whereby the elapsed time of fall may be read by observing the position of the index element 21 relative to scale 22.

Alternatively, the float member 19 may be made of a material having a density somewhat less than that of the liquid 18, whereby elapsed time may be determined by observing the position of the index element 21 relative to the scale as the float member rises from the bottom of tube 12.

It will be understood that the rate of movement of the float member 19 will depend on the rate at which the float member moves through the viscous liquid, i. e., mainly, the rate at which the liquid passes through the bore 20, and that the time required for the float to move through the tube is a function of (a) the density difference between the float 19 and the liquid medium 18, (b) the viscosity of the liquid medium 18, (c) the mass of the float, and, at constant density, (d) the size of the float. By selecting a liquid of density lower than that of the float, the float may be made to sink at a predetermined rate, and, conversely, by selecting a liquid of a density greater than that of the float, the float can be made to rise at a predetermined rate. However, in the preferred form of the invention, the density of the float is slightly higher than that of the liquid, so that elapsed time is indicated by the downward movement of the float from the top end of the tube 12, as illustrated in Figure 1.

It will be further understood that the float 19 may be returned to its starting position by merely inverting the device 11 so that it rests on the member 15.

In the form of the invention illustrated in Figure 7, the tube 12 is secured between the opposite arms 23 and 24 of a U-shaped bracket member 25, said arms being horizontal, as illustrated. Secured to the midpoint of the main body of bracket 25 is a horizontal shaft element 26 which is journalled in a bearing sleeve 27 formed on the top end of an upstanding supporting plate 28. Plate 28 has a horizontal base flange 29 which is receivable beneath a telephone set 30, between the supporting feet 31 of the telephone set, whereby the upstanding plate 28 is supported adjacent the edge of the telephone set. Secured to shaft 26 at its outer end is the knob 32. Knob 32 is provided with the reduced inner portion 33 having the diametrically opposed notches 34, 34 formed therein. Secured to the plate member 28 below knob 32 at 36 is the end of a spring arm 35, said spring arm being formed at its free end with a detent loop 37 lockingly engageable in the notches 34.

Thus, the tube 12 may be yieldably locked either in a first vertical position, shown in Figure 7, or in an inverted vertical position, by rotating knob 32 a half turn from the position thereof shown in said figure. Therefore, the timing device of Figure 7 may be employed in the same manner as that of Figure 1, the float 19 being returned to its starting position in tube 12 by inverting the tube from the position of Figure 7, as above described.

The indicating float may be made in a variety of different shapes, within the spirit of the present invention, and by employing suitable clearance between the float and the inside surface of the tube, the bore 20 may be omitted, if so desired. Thus, the float may be substantially a true cylinder, as shown at 38 in Figure 4, may be substantially spherical with a short cylindrical intermediate portion, as shown at 39 in Figure 5, or may be substantially conical with a short cylindrical base portion, as shown at 40 in Figure 6.

Some of the important advantages of timing devices according to the present invention are:

1. The possibility of varying the time scale over a wide range (seconds to days) while retaining the same overall physical dimensions of the device, by varying the size of the float or its mass, by changing the density ratio between the float and float medium, by employing liquids of different density, and by using liquids of different viscosity.

2. Whereas, the conventional sand timer of the hour glass type merely indicates when the total time interval for which it is designed, e. g., 3 or 5 minutes, has elapsed, the device of the present invention indicates the specific value of the time elapsed and the specific value of time still available. This is of special importance in applications such as timing telephone calls, or in parking meters. Furthermore, the reading of the indicator line element 21 against the external scale 22 on the tube 12 allows for a far more accurate timing procedure than the sand timer, where no well-defined level exists at any time of its operation.

While any liquid composition of suitable viscosity may be employed in the tube 12, the preferred liquids are those such as silicone liquids, which exhibit relatively small dependence of viscosity on temperature in the range of room temperatures likely to be encountered in practice. This increases the accuracy of the device.

By employing the central bore 20, as above explained, it is possible to use mass-produced tubing of non-uniform diameter for the tube element 12, and to reduce the effect of variations in float-to-wall clearance on the rate of movement of the float.

It is preferred that the top and bottom ends of float member 19 be spherically round since in this manner the areas of contact between said top and bottom ends and the flat top and bottom walls of tube 12 are reduced to a minimum. This is important, because a float with flat top and bottom surfaces exhibits a tendency to stick to the top and bottom walls of the tube upon making contact therewith. This sticking may render the operation of the device somewhat erratic and tends to retard the movement of the float in the initial phases of operation of the timing device.

While certain specific embodiments of timing devices have been disclosed in the foregoing description, it will be understood that various modifications within the spirit of the invention may occur to those skilled in the art. Therefore it is intended that no limitations be placed on the invention except as defined by the scope of the appended claim.

What is claimed is:

A timing device comprising a transparent tube provided with a time scale along its surface, said tube being closed at both ends and being completely sealed, silicone liquid completely filling said tube, said liquid having a viscosity which exhibits a minimum dependence on temperature, means at the ends of the tube for supporting said tube either in upright or inverted positions, and a float member slidably disposed in said tube and being entirely contained therein, said float member being of a material different in density than said liquid and being formed with a bore connecting its top and bottom surfaces, the ends of the bore being open and completely unobstructed at all times, whereby liquid may move freely through said bore as the float member moves vertically in said tube both in the upright and inverted positions of the tube, said float member being visible from outside the tube at all positions therealong.

References Cited in the file of this patent

UNITED STATES PATENTS

| | | |
|---|---|---|
| 1,443,573 | Hinckley | Jan. 30, 1923 |
| 1,665,804 | Walsh | Apr. 10, 1928 |
| 1,694,059 | Denny | Dec. 4, 1928 |
| 2,234,437 | Kistler | Mar. 11, 1941 |
| 2,375,375 | Lundeen | May 8, 1945 |
| 2,606,611 | Fleischer | Aug. 12, 1952 |